Nov. 28, 1950 W. HOMOKY 2,531,816
TROTLINE FISHING REEL
Filed Jan. 29, 1947 2 Sheets-Sheet 1

INVENTOR.
WILLIAM HOMOKY
BY
ATTORNEY.

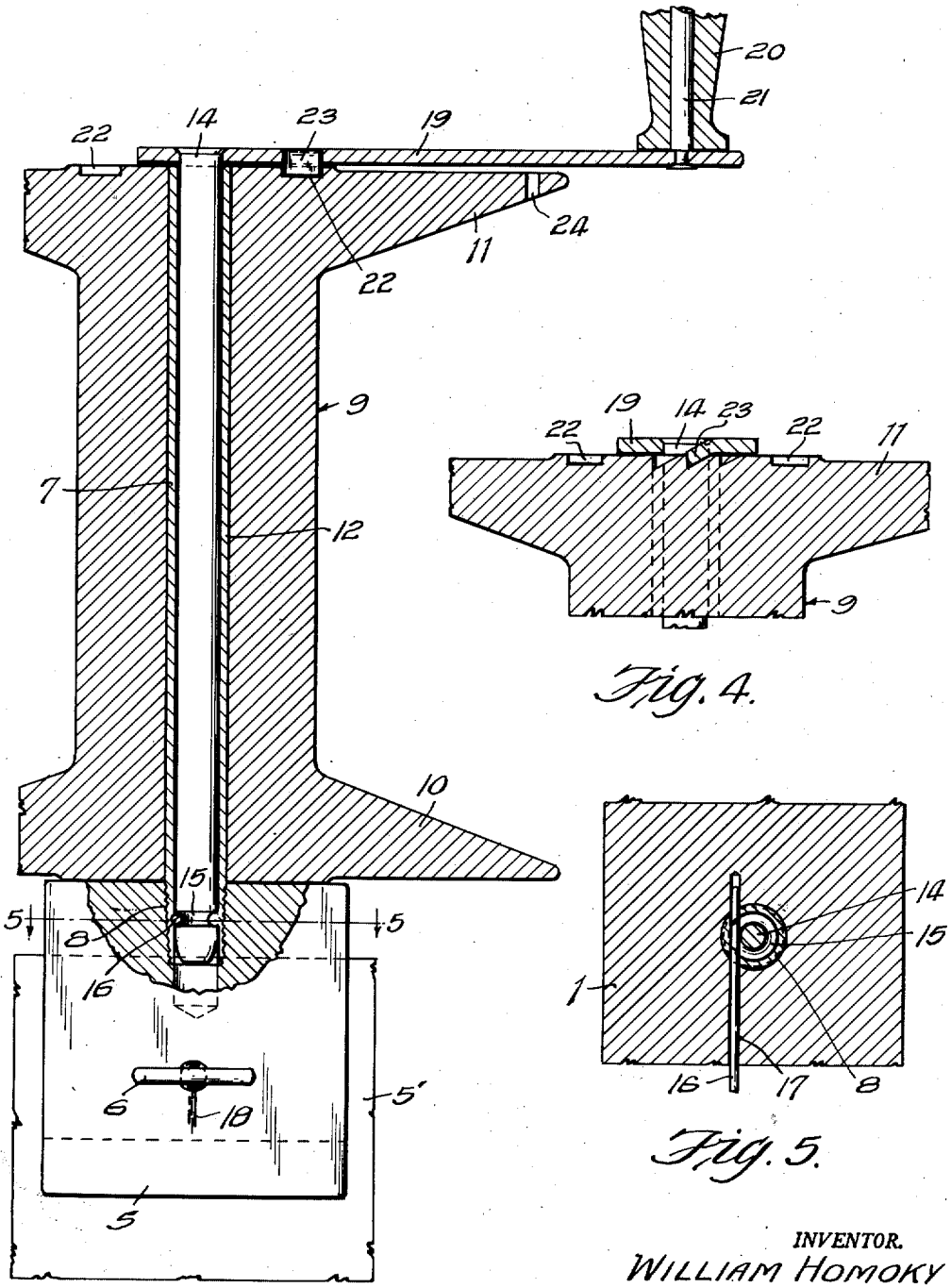

Patented Nov. 28, 1950

2,531,816

UNITED STATES PATENT OFFICE 2,531,816

TROTLINE FISHING REEL

William Homoky, St. Louis, Mo.

Application January 29, 1947, Serial No. 724,955

8 Claims. (Cl. 242—106)

This invention relates to a trotline fishing reel, and more particularly to a reel for boat use.

The primary object of my present invention is to provide portable, efficient and light weight means adapted for detachable connection with a convenient part of a motor, or other boat for paying-out and reclaiming a trotline, one end of which has been anchored to a support on the shore of a river, or a lake.

A further object of the invention is to provide a trotline fishing reel adapted to be detachably secured to the stern, bow, side, or the seat, or other part of a motor boat, or other boat, in an upright, or a horizontal position for automatically paying-out a trotline thereon as the boat is in motion when one end thereof is anchored to a support on the shore of a river, or lake, and for manually reclaiming the trotline during movement of the boat in a direction opposite to that of the paying-out direction.

Another one of the objects of the invention is the provision of means for supporting leaders having fishhooks thereon with, or without being detached from the trotline.

Another object of the invention is the construction of a device, as described, which is simple, durable, and wherein the several parts of the device are separable from each other, and which can be manufactured and sold at a reasonable cost.

For further comprehension of the invention, and of the objects and advantages thereof, reference will be had to the following description and accompanying drawings, and to the appended claims, in which the various novel features of the invention are more particularly set forth.

In the accompanying drawings forming a material part of this disclosure:

Fig. 3 is a sectional detail of the device showing the crank-pin and crank supported by a tubular upright member, which member supports the spool, and showing means for detachably locking the crank-pin against longitudinal displacement.

Fig. 4 is a sectional detail showing the ratchet connection between the spool and the crank, and taken on line 4—4 of Fig. 1.

Fig. 5 is a detail taken on line 5—5 of Fig. 3.

Figure 1:
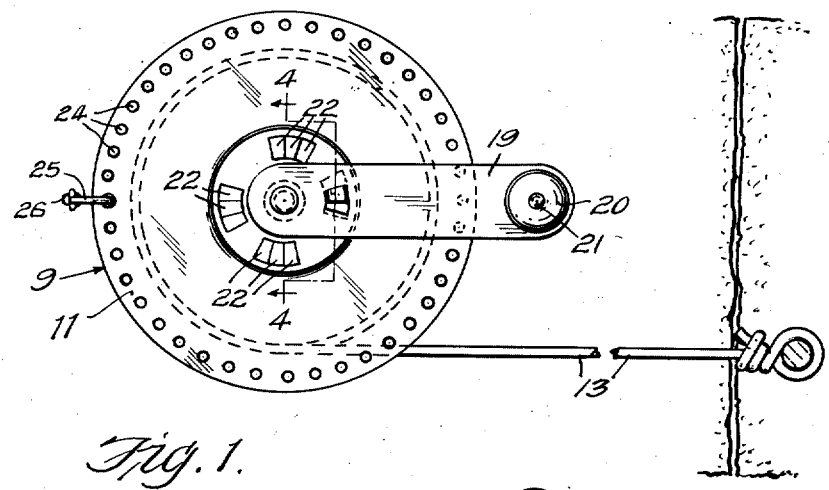
Fig. 1 is a top plan view of a device constructed in accordance with the invention.

In reducing my invention to practice, I provide, in the embodiment illustrated, a body member designated, generally, as 1, which is fashioned to provide a horizontally disposed C-clamp 2 for detachable connection with a seat 3 to attach the reel structure in a vertical position, or to the stern side, or other part of the boat in a horizontal position, by means of a clamping screw 4, and, an inverted C-clamp 5 for detachable connection with the side wall 5' of a boat in a vertical position by means of a clamping screw 6. The two clamp portions 2 and 5 are arranged side by side and are an integral part of the body member 1.

A cylindrical tubular member 7 is suitably supported by the body member 1 and is preferably detachably connected as by screw-threads to the body member 1, as at 8, although not necessarily so, as the upright tubular member, or post may be otherwise connected or cast integral with the body member 7.

A suitable fishing-line reel spool 9 having suitable end walls, or flanges 10 and 11 is provided with a central longitudinal bore, or opening 12, and the spool is slidably and rotatably mounted on the upright tubular member, or post 7, and is removable therefrom. A suitable, or usual trotline 13 is adapted to be initially wound around the spool 9.

A suitable crank-pin 14 has telescopic and removable connection with the tubular member, or post 7. Adjacent the lower end of the crank-pin 14, there is provided a suitable peripheral groove 15 for receiving a locking-pin 16 slidably mounted in an opening 17 in the clamp member 1 for locking the crank-pin 14 against longitudinal displacement when the reel structure is attached to the boat in a horizontal position. The locking-pin 16 may be connected with the screw 6 by means such, for instance, as a chain 18 to keep the pin from becoming lost.

A suitable crank arm 19 is suitably secured to the upper end of the crank-pin 14 and is preferably, although not necessarily of such length as to project a suitable distance beyond the peripheral face of the spool flange 11. A suitable handle 20 is rotatably mounted on a suitable supporting pin 21, which is suitably secured to and supported in an upright position at the outer free end of the crank member 19.

A suitable ratchet connection is arranged between the crank arm 19 and the hub portion of the outer face of the spool flange 11 and is so arranged by providing the outer face of the hub portion of the spool flange 11 with a plurality of suitable recessed ratchet teeth 22, and by providing the crank member with a single suitable inclined finger, or dog 23 preferably, although not necessarily struck from the crank arm material and bent downwardly at an incline to engage with one of the recessed ratchet teeth 22 at a time. The ratchet teeth 22 can be contacted selectively with the crank arm finger 23 for the purpose of manually rotating the spool 9 on and around the tubular member 7 in one direction only.

It will be clearly apparent from the arrangement of parts assembled, as above described, that they may be easily and quickly assembled, or separated from one another as and when desired.

The flange 11 of the spool may be provided with a multiplicity of suitable circularly arranged holes 24 adjacent the peripheral edge of the flange so arranged to provide supporting means for fishhooks 25 attached on leaders 26, whether the leaders are attached to, or detached from the trotline 13 which is wound upon and unwound from the line supporting spool 9.

Figure 2:
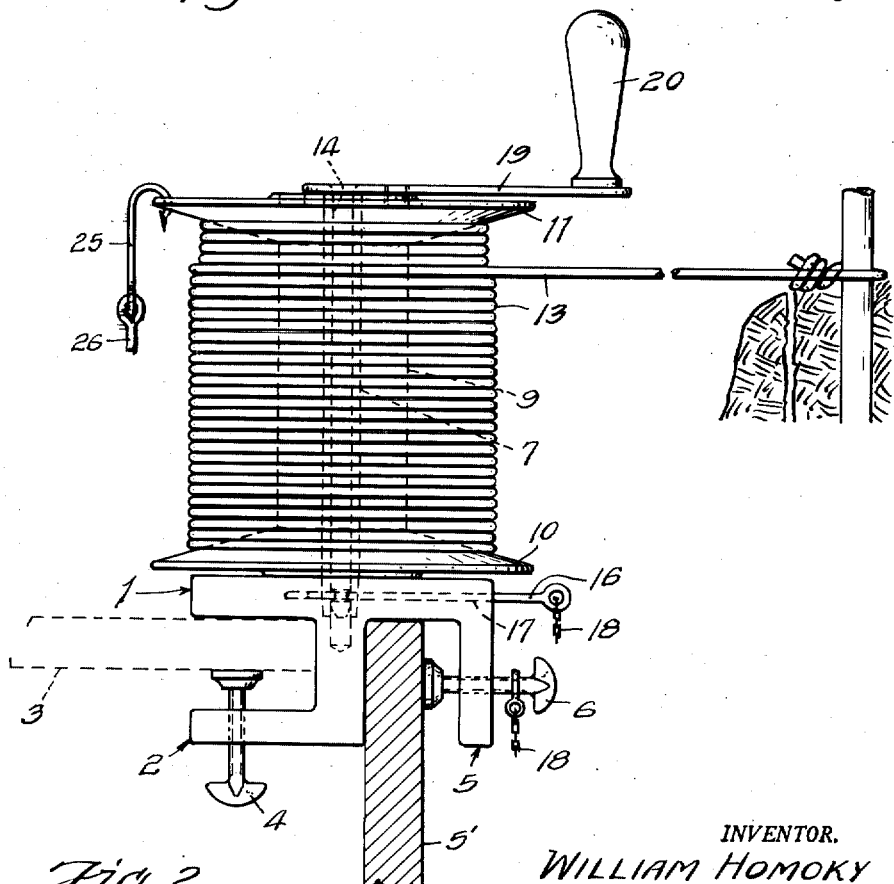
Fig. 2 is a side elevation of the device embodying the features of the invention, and shown as attached to a boat in a vertical position.

The operation of the device is as follows:

The reel assembly, as shown in Fig. 2, is attached to a boat by means of the C-clamps and secured thereto by either the screw members 4 or 6, and assumes either an upright or a horizontal position, as shown. A suitable trotline 13 is wound around the spool 9 with the leaders 26 preferably, although not necessarily removed from the line 13 and when removed with the hooks 25 on the leaders passing through their respective flange opening 24 in the spool for supporting the hooks and leaders in suitably spaced relation around the spool.

When it is desired to pay-out the trotline, the free end of the trotline is anchored to a suitable support, such as a tree, stake, or the like on the shore. The boat to which the reel assembly is attached, when moved forward, causes the trotline 13 to unreel from the spool 9. If leaders 26 are attached at predetermined intervals along the trotline 13 and the hooks 25 thereon are attached to the spool flange 11 when paying-out the trotline, the hooks 25 will have to be detached from the spool flange 11 as the trotline 13 unwinds from the spool, or, if the leaders 26 have already been detached from the trotline 13, they may be attached to the trotline after the opposite end of the trotline has been anchored.

When the trotline has been paid-out, the spool 9 to which the other end of the trotline 13 is suitably secured, is removed from the tubular post 7 after the crank-pin has been removed from the tubular post 7 and it is then to be anchored to a tree, or other suitable support on an opposite shore of a river, or to a support buoyed in a river, or a lake.

When it is desired to reclaim the trotline, the spool 9 is remounted on the tubular support 7 and the hand crank replaced with relation to the tubular member 7 and the spool 9 to complete the ratchet connection between the hand crank and the spool 9.

The leaders 26 may first all be removed from the trotline before the trotline is wound on the spool 9, or, if the leaders 26 are desired to be left on the trotline 13, the hooks 25 may then be attached to the spool flange 11 by being positioned in the holes 24 therein while winding the trotline 13 on the spool 9. The trotline 13 is manually wound on the spool 9 causing the boat to move toward the shore where the free end of the trotline is attached to its support.

The many advantages of the herein described invention will readily suggest themselves to those skilled in the art to which it appertains.

It is to be understood that I do not limit myself to the showing made in the accompanying drawings and description thereof, as I may adopt variations of the form within the spirit and scope of my invention as pointed out in, and, limited solely by the appended claims.

What I claim is:

1. In a device of the class described, a clamp structure adapted to be attached to a boat, a tubular member secured to and projecting from said structure, a spool mounted for rotation on said tubular member, a crank, means connected with the crank having telescopic connection within the tubular member for positioning the crank in operative position.

2. In a device as defined in claim 1, including a ratchet connection between the crank and one end of the spool.

3. In a trotline fishing reel structure, a supporting member adapted to be detachably connected to a part of a boat, a spool longitudinally slidable and rotatably mounted on the supporting member, a crank having a portion thereof in telescopic connection with the supporting member, and means arranged to cause the spool to rotate in one direction upon manually operating the crank.

4. A trotline fishing reel for attachment to a boat, having, in combination, integral dual clamping members arranged at a right angle to each other, a tubular member projecting from a common wall portion of the clamping members, a reel mounted for longitudinal sliding and rotary movement on the tubular member, a crank-pin having telescopic connection with the tubular member, and a crank secured at its inner end to the outer end of the crank-pin.

5. In a device as defined in claim 4, wherein the lower end portion of the pin is provided with a peripheral groove, and a pin slidably mounted in a portion of the dual clamping members for locking the crank-pin against longitudinal displacement when the trotline fishing reel is attached to the boat in a horizontal position and for releasing the crank-pin for removal from the tubular member.

6. In a device as defined in claim 4, including ratchet teeth suitably arranged in circular fashion on the outer face of one end of the reel, a stationary ratchet dog on the crank adjacent the inner end thereof adapted for engagement with any one of the ratchet teeth for manually rotating the reel in one direction upon rotation of the crank.

7. In a trotline fishing reel structure, the combination with a dual clamp, an elongated tubular bearing member supported by the clamp, a reel slidably mounted on the bearing member adapted to have a trotline attached thereto and rotatable in opposite line paying-out and reclaiming directions, means having longitudinal sliding connection within the tubular bearing member, and means connected with the aforesaid means for manually rotating the reel in the line reclaiming direction.

8. In a trot-line reel structure, a dual clamp structure adapted to be detachably connected to a boat, a tubular member anchored at one end to the clamp structure, a spool detachably mounted for rotation upon the tubular member, the outer end face of the spool having a series of facial recesses, a crank including a crank-arm, a handle and a crank-pin, the crank-pin being telescoped within the tubular member, a finger projecting from the crank-arm and engageable in a selected recess, and means having detachable connection with the inner end portion of the crank-pin to prevent outward movement of the spool upon the tubular member.

WILLIAM HOMOKY.

REFERENCES CITED

The following references are of record in the file of this patent:

UNITED STATES PATENTS

| Number | Name | Date |
|---|---|---|
| 875,778 | Claypool | Jan. 7, 1908 |
| 1,310,816 | Weiss | July 22, 1919 |
| 1,397,790 | Tegner | Nov. 22, 1921 |
| 1,956,806 | Mitzen et al. | May 1, 1934 |
| 1,993,150 | Drake | Mar. 5, 1935 |
| 2,225,309 | Lawrence | Dec. 17, 1940 |

FOREIGN PATENTS

| Number | Country | Date |
|---|---|---|
| 53,408 | Sweden | Jan. 10, 1923 |
| 57,415 | Sweden | Sept. 2, 1924 |